(12) United States Patent
Suzuki

(10) Patent No.: US 9,948,850 B2
(45) Date of Patent: Apr. 17, 2018

(54) IMAGE SENSOR, CONTROL METHOD FOR THE SAME, AND IMAGE CAPTURE APPARATUS

(71) Applicant: CANON KABUSHIKI KAISHA, Tokyo (JP)

(72) Inventor: Satoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/224,772

(22) Filed: Aug. 1, 2016

(65) Prior Publication Data

US 2017/0041563 A1    Feb. 9, 2017

(30) Foreign Application Priority Data

Aug. 5, 2015   (JP) .................................. 2015-155390

(51) Int. Cl.
| | |
|---|---|
| H04N 5/232 | (2006.01) |
| H04N 5/3745 | (2011.01) |
| H04N 5/369 | (2011.01) |
| H04N 9/04 | (2006.01) |

(52) U.S. Cl.
CPC ....... *H04N 5/23212* (2013.01); *H04N 5/3696* (2013.01); *H04N 5/37457* (2013.01); *H04N 9/045* (2013.01)

(58) Field of Classification Search
CPC .. H04N 5/23212; H04N 9/045; H04N 5/3696; H04N 5/37457
See application file for complete search history.

(56) References Cited

U.S. PATENT DOCUMENTS

| | | | | |
|---|---|---|---|---|
| 6,819,360 B1 * | 11/2004 | Ide | ................... | H01L 27/14627 |
| | | | | 257/E27.131 |
| 8,773,560 B2 | 7/2014 | Okita et al. | | |
| 8,928,791 B2 | 1/2015 | Okita et al. | | |
| 8,964,061 B2 * | 2/2015 | Hirose | ............... | H04N 5/23212 |
| | | | | 348/230.1 |
| 9,001,262 B2 * | 4/2015 | Onuki | ................ | H04N 5/23212 |
| | | | | 348/222.1 |
| 9,172,925 B2 * | 10/2015 | Sugawara | ................ | G02B 7/34 |
| 9,185,317 B2 * | 11/2015 | Nakagawa | ................ | G02B 7/34 |
| 2013/0113966 A1 * | 5/2013 | Arishima | ................ | H04N 5/378 |
| | | | | 348/301 |
| 2013/0201383 A1 * | 8/2013 | Okado | ..................... | G02B 7/34 |
| | | | | 348/345 |

FOREIGN PATENT DOCUMENTS

| | | |
|---|---|---|
| EP | 1085751 A2 | 3/2001 |
| JP | 2001-083407 A | 3/2001 |
| JP | 2013-106194 A | 5/2013 |

* cited by examiner

*Primary Examiner* — Shahbaz Nazrul
(74) *Attorney, Agent, or Firm* — Fitzpatrick, Cella, Harper & Scinto

(57) ABSTRACT

Disclosed is an image sensor capable of efficiently implementing readout of signals for focus detection and image signals. The disclosed image sensor has a first type of pixel row and a second type of pixel row in which focus detection pixels and imaging pixels are respectively arranged in a first pattern and a second pattern. Readout control that differs between the first type of pixel row and the second type of pixel row is performed, according to the arrangement pattern of the focus detection pixels and the imaging pixels.

16 Claims, 9 Drawing Sheets

IMAGE SENSOR, CONTROL METHOD FOR THE SAME, AND IMAGE CAPTURE APPARATUS

BACKGROUND OF THE INVENTION

Field of the Invention

The present invention relates to an image sensor, a control method for the same, and an image capture apparatus, and more particularly to an image sensor capable of acquiring signals to be used in performing focus detection with a phase difference detection method, and a drive method for the same.

Description of the Related Art

Japanese Patent Laid-Open No. 2001-083407 discloses an apparatus that performs focus detection with a pupil division method, using an image sensor having a micro lens formed in each of pixels that are disposed two-dimensionally. In this apparatus, a photoelectric conversion portion of each pixel is divided into two regions that receive, via the micro lens, light beams that have passed through different regions of an exit pupil of a taking lens. An A image and a B image are respectively generated from the output of the first and second divided regions of a plurality of pixels, and a defocusing amount can be detected, based on a phase difference (shift amount) of the A image and the B image. Also, a normal image signal can be obtained by combining the output of the first divided region and the second divided region on a pixel-by-pixel basis.

In the case of reading out signals from an image sensor having such a configuration, twice the readout time is required when reading out by divided region than in the case of reading out one signal per pixel. Thus, Japanese Patent Laid-Open No. 2013-106194 proposes a technology for reading out the signal of the first divided region first after reading out a reset signal, and then combining the signal of the second divided region with the signal of the first divided region and reading out the combined output. Although a reset signal needs to be read out therebefore, reading out of a reset signal is, in the case of reading out the signal of the second divided region, rendered unnecessary by reading out the combined output, enabling the readout time to be shortened. The signal of the second divided region can be obtained by subtracting the signal of the first divided region from the combined output.

The method of Japanese Patent Laid-Open No. 2013-106194 enables a reduction in the number of times that a reset signal is read out, although since two signals are read out for one pixel, more time is still required than in the case of reading out one signal per pixel, and further shortening of the readout time is desired.

SUMMARY OF THE INVENTION

The present invention has been made in view of such problems with the conventional technologies, and provides an image sensor capable of efficiently implementing readout of signals for focus detection and image signals, and a drive method for the same.

According to an aspect of the present invention, there is provided an image sensor comprising: a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and a controller that controls signal readout from the pixel array, wherein the focus detection pixels and the imaging pixels are arranged in a first pattern in a first type of pixel row in the pixel array, and the focus detection pixels and the imaging pixels are arranged in a second pattern in a second type of pixel row in the pixel array, and the controller performs readout control that differs between the first type of pixel row and the second type of pixel row.

According to another aspect of the present invention, there is provided an image capture apparatus comprising: an image sensor; a focus detection unit that performs focus detection with a phase difference detection method using focus detection signals read out from focus detection pixels of the image sensor; and an adjustment unit that adjusts a focus of an imaging optical system, based on a result of the focus detection, wherein the image sensor includes: a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and a controller that controls signal readout from the pixel array, the focus detection pixels and the imaging pixels are arranged in a first pattern in a first type of pixel row in the pixel array, and the focus detection pixels and the imaging pixels are arranged in a second pattern in a second type of pixel row in the pixel array, and the controller performs readout control that differs between the first type of pixel row and the second type of pixel row.

According to a further aspect of the present invention, there is provided a control method for an image sensor having a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal, the focus detection pixels and the imaging pixels being arranged in a first pattern in a first type of pixel row in the pixel array, and the focus detection pixels and the imaging pixels being arranged in a second pattern in a second type of pixel row in the pixel array, the method comprising: performing readout control that differs between the first type of pixel row and the second type of pixel row.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Configurations of Image Sensor and Pixels

Figure 1A:
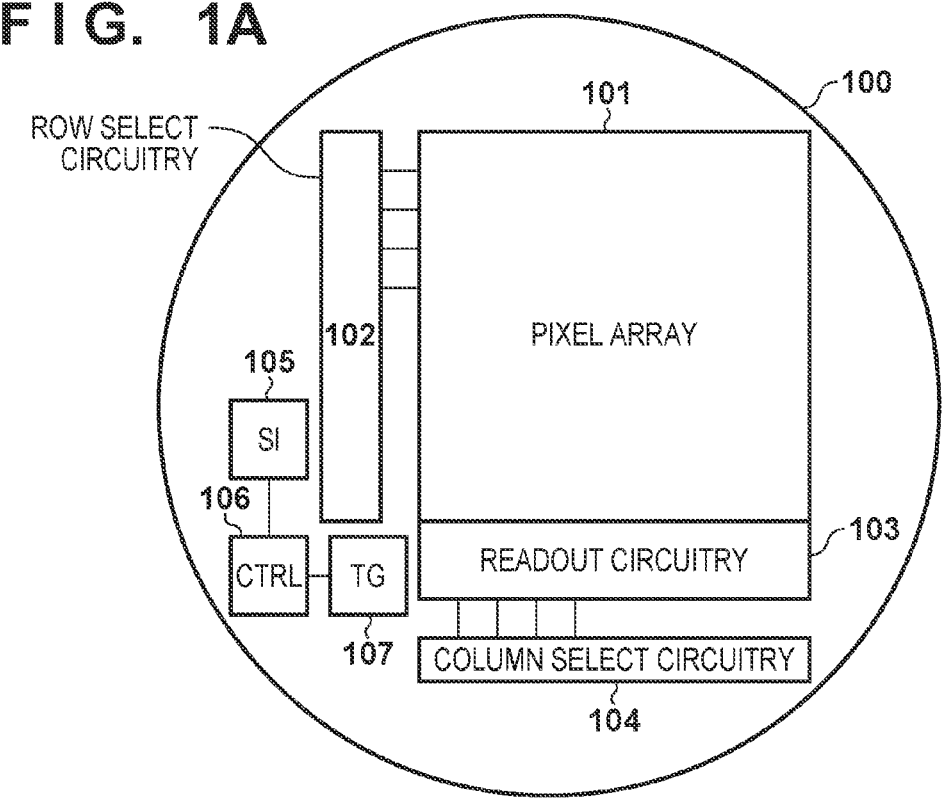
FIGS. 1A to 1D are diagrams schematically showing exemplary configurations of an image sensor and pixels according to an embodiment.

FIGS. 1A to 1D are diagrams schematically showing an exemplary configuration of an image sensor according to an embodiment of the present invention. FIG. 1A schematically shows a circuitry disposition, with an image sensor 100 having a pixel array 101, a row select circuitry 102 that selects pixel rows within the pixel array 101, and a column select circuitry 104 that selects pixel columns within the pixel array 101. The image sensor 100 further has a readout circuitry 103 that reads out the signals of pixel rows selected by the row select circuitry 102, and a serial interface (SI) 105 for externally setting an operating mode and the like of circuitry inside the image sensor 100.

Also, the readout circuitry 103 has a memory that accumulates signals, a gain amplifier, an A/D converter, and the like every pixel column. The image sensor 100 further has a timing generator (TG) 107, a control circuit or a controller (CTRL) 106 that controls the operations of the image sensor 100 including the operations of the TG 107, and the like. The TG 107 provides timing signals such as drive pulses to the row select circuitry 102, the column select circuitry 104, the readout circuitry 103, and the like.

The row select circuitry 102 selects the plurality of pixel rows in order, and signals are read out by the readout circuitry 103. The column select circuitry 104 then sequentially selects the plurality of pixel signals read out by the readout circuitry 103 on a column-by-column basis.

Figure 1B:
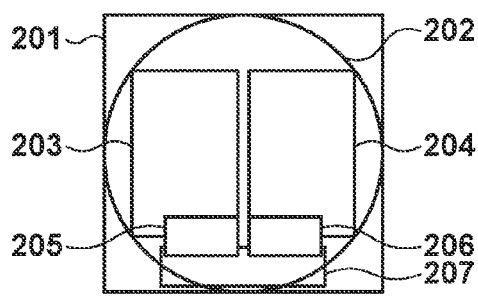
Figure 1C:
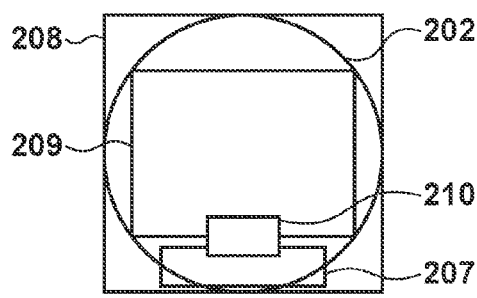

FIGS. 1B and 1C are diagrams schematically showing configurations of two types of pixels that are disposed in the pixel array 101. FIG. 1B shows an exemplary configuration of a pixel (hereinafter, for convenience, called a focus detection pixel) from which a signal (focus detection signal) to be used in performing focus detection with a phase difference detection method is read out, and a signal (image signal) constituting a captured image. Also, FIG. 1C shows an exemplary configuration of a pixel (hereinafter, for convenience, called an imaging pixel) that only reads out an image signal. In FIGS. 1B and 1C, the same reference numerals are given to constituent elements that are the same.

The focus detection pixel 201 has a plurality of photoelectric conversion portions or photoelectric conversion regions, and, hereinafter, each of the plurality of photoelectric conversion portions will be described as one photodiode (PD). In the present embodiment, the focus detection pixel 201 is assumed to have two PDs 203 and 204, but may have more PDs. The PDs 203 and 204 realize a pupil division function by sharing a micro lens 202 that is in a conjugate relationship with an exit pupil of an imaging optical system. An image signal based on the group of outputs of the PDs 203 and an image signal based on the group of outputs of the PDs 204 can then be generated from a plurality of focus detection pixels 201 as a pair of image signals for phase difference detection.

Transfer switches 205 and 206 are respectively switches for reading out the signals of the PDs 203 and 204. Also, a floating diffusion (hereinafter, FD) 207 temporarily accumulates signals read out through the transfer switches 205 and 206. Note that the focus detection pixel 201 is provided with constituent elements other than the constituent elements shown in the diagram, with these being described in detail later.

In the imaging pixel 208, the photoelectric conversion region is not divided. Accordingly, the imaging pixel 208 has one PD 209. Since there is one PD in the imaging pixel 208, there is also one transfer switch 210. The size of the light receiving surface of the PD 209 is equivalent to the total size of the light receiving surfaces of the PDs 203 and 204 of the focus detection pixel 201. In other words, a similar signal to the PD 209 of the imaging pixel can be obtained by combining the signals of the PDs 203 and 204 of the focus detection pixel 201.

It should be noted that since the pixels capable of performing readout as focus detection pixels are thus capable of performing readout as imaging pixels, the names "focus detection pixel" and "imaging pixel" merely indicate differences in application, and do not necessarily signify differences in structure. For example, all of the pixels may be configured as shown in FIG. 1B. In this case, the pixels can be used as either "focus detection pixels" or "imaging pixels" by differentiating the readout method.

Figure 1D:
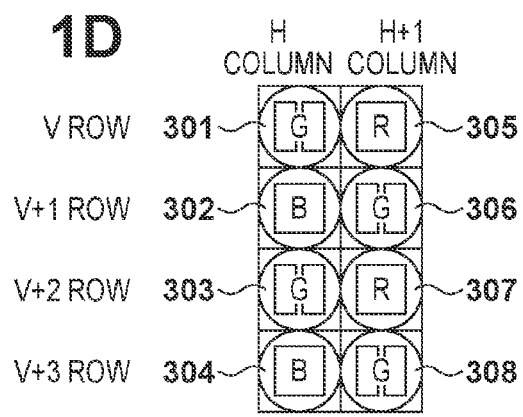
Figure 8:
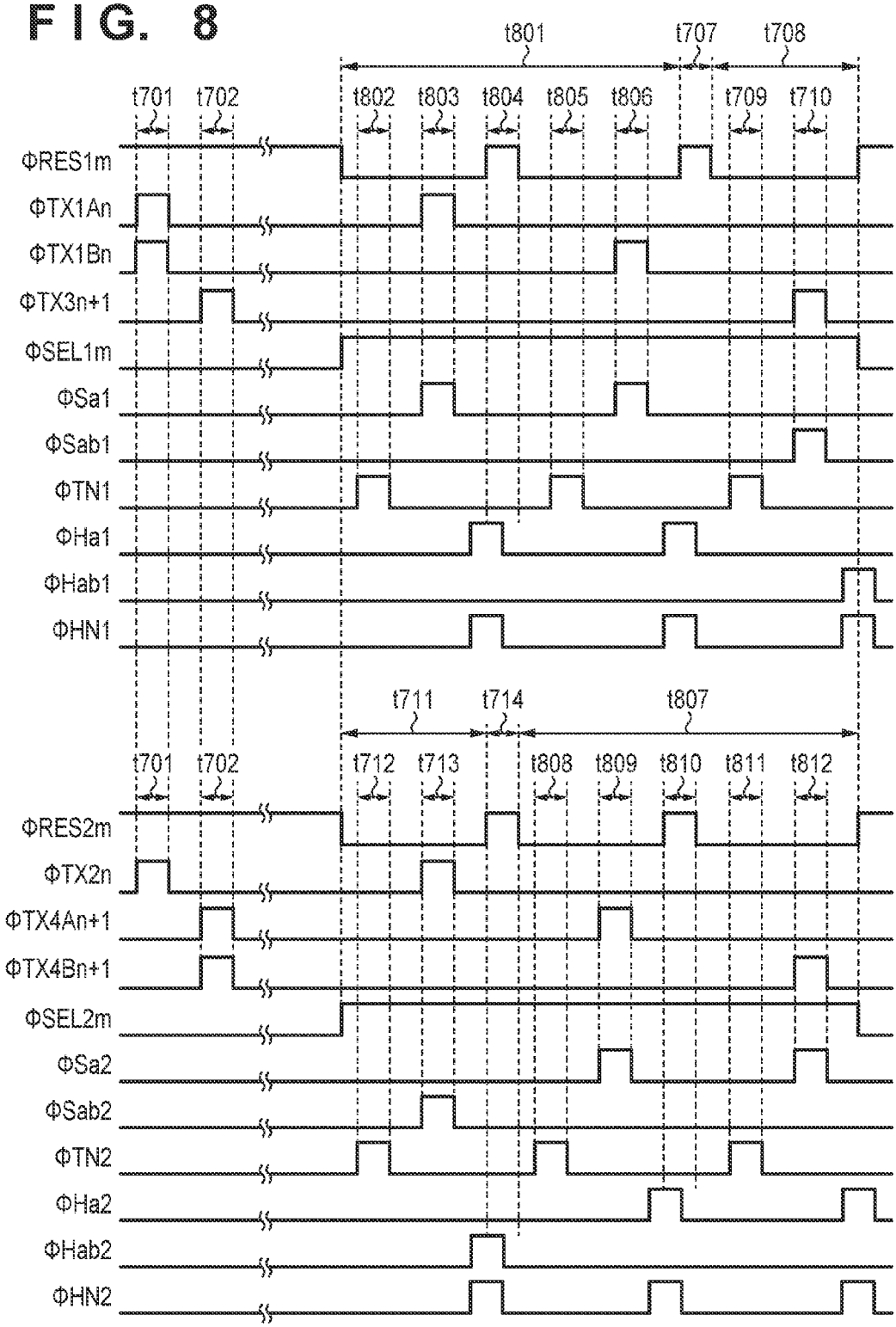
FIG. 8 is a timing chart for realizing another readout operation in the second embodiment.

FIG. 1D is a diagram schematically representing an example of the pixel disposition in the pixel array 101. In FIG. 1D, 8 pixels constituting four rows and two columns are shown, this being a very small portion of the large number of pixels (e.g., 10 million pixels) disposed in the pixel array 101. Here, the pixels are assumed to be disposed in a grid shape in the horizontal direction (row direction) and the vertical direction (column direction).

The pixel 301 is a pixel disposed in the Hth column and the Vth row, and a pixel 302 is a pixel disposed in the Hth column and the V+1th row. The position of other pixels can also be similarly specified with a column number and a row number. Pixels 301, 303, 306 and 308 are focus detection pixels, and pixels 302, 304, 305 and 307 are imaging pixels. Also, R (red), G (green) and B (blue) indicate the colors of color filters provided on the respective pixels, and, in the present embodiment, the color filters are provided on the pixels in a color arrangement called a primary color Bayer pattern. Accordingly, pixel rows in which R and G are alternately disposed and pixel rows in which G and B are alternately disposed exist alternately in the vertical direction.

As shown in FIG. 1D, in the present embodiment, the pixels (G pixels) on which the G filter is provided are used as focus detection pixels. This is because the G pixels are advantageous in terms of phase difference detection accuracy, since the level of signals that are transmitted by the G filter is higher than the level of signals that are transmitted by the R filter and the B filter. It is, however, not necessary to use the G pixels as the focus detection pixels. In this case, all of the G pixels are used as imaging pixels. In other words, the G pixels are used as only one of focus detection pixels or imaging pixels.

Accordingly, in the example shown in FIG. 1D, the arrangements of focus detection pixels and imaging pixels in horizontal pixel rows are alternated in a one row cycle in the vertical direction (column direction). In this specification, the rule for arranging the focus detection pixels and the imaging pixels within a pixel row is called an arrangement pattern. In the present embodiment, pixel rows having different arrangement patterns are alternately disposed cyclically, for example, in the pixel array 101. Although, in FIG. 1D, pixel rows (first type of pixel rows) having a first arrangement pattern and pixel rows (second type of pixel rows) having a second arrangement pattern are disposed alternately in a single row cycle, this is by way of example. For example, the first type of pixel rows and the second type of pixel rows may be alternately disposed every two rows, or a pixel row that does not have focus detection pixels may be provided between first and second types of pixel rows. Also, with regard to the arrangement pattern of focus detection pixels and imaging pixels, the focus detection pixels and the imaging pixels within a pixel row do not need to be alternately disposed in a single pixel cycle.

Figure 2:
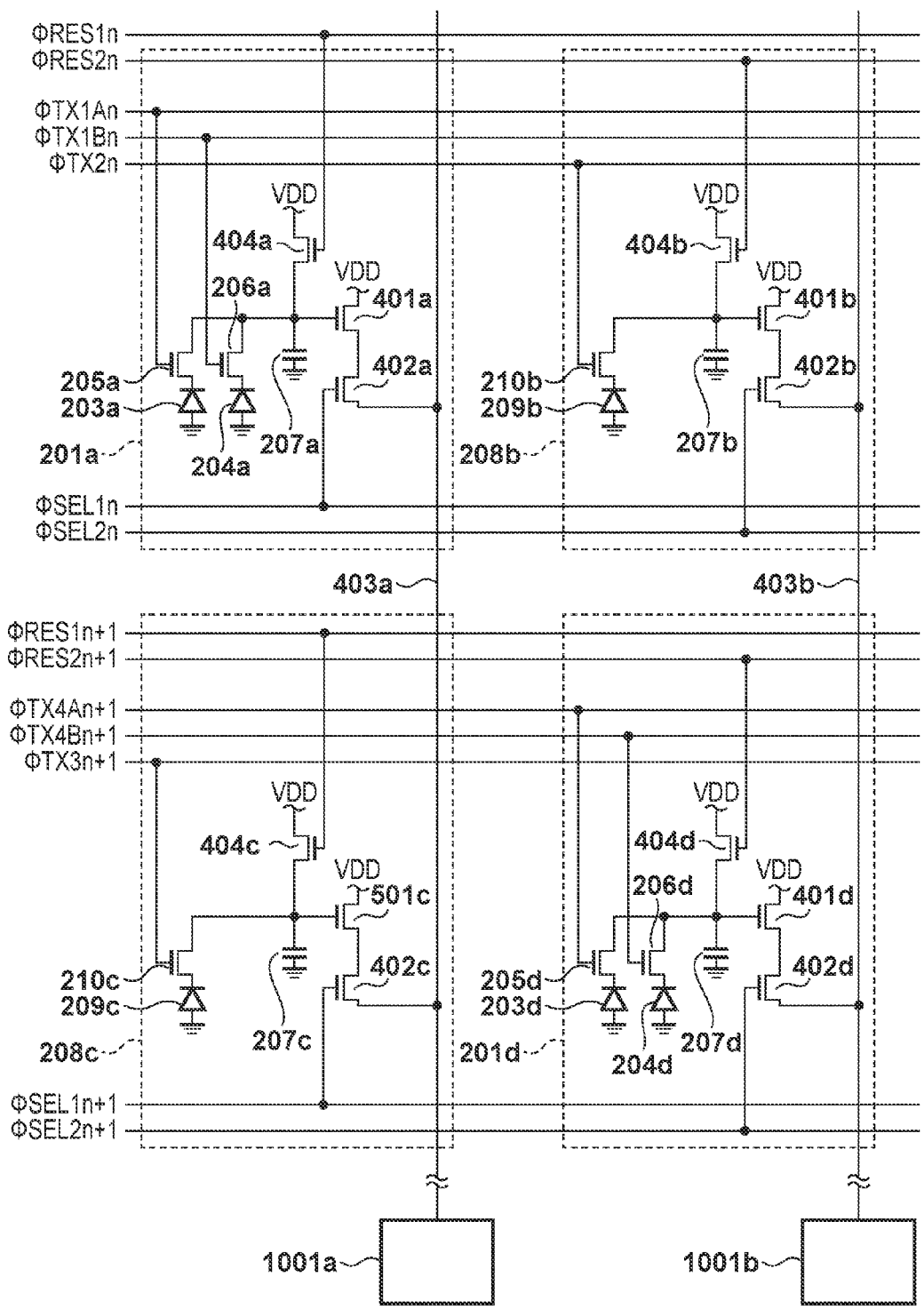
FIG. 2 is an equivalent circuit diagram showing an exemplary configuration of part of a pixel array in a first embodiment.

FIG. 2 is an equivalent circuit diagram for two rows and two columns in which focus detection pixels 201a and 201d and imaging pixels 208b and 208c are alternately disposed horizontally and vertically in the pixel array 101 of the present embodiment. In FIG. 2, the same reference numerals as FIGS. 1B and 1C are given to constituent elements that are the same, and a, b, c or d is added according to the pixel position.

Transfer switches 205a, 206a, 210b, 210c, 205d and 206d are respectively switches that transfer photocharge generated in each of the PDs 203a, 204a, 209b, 209c, 203d and 204d to the floating diffusion 207. The transfer switches 205a, 206a, 210b, 210c, 205d, and 206d are respectively driven by transfer pulses φTX1An, φTX1Bn, φTX2n, φTX3n+1, φTX4An+1, and φTX4Bn+1.

FDs 207a to 207d function as buffers that temporarily accumulate charge. Amplification MOS amplifiers 401a to 401d function as source followers. Select switches 402a to 402d are respectively driven by vertical selection pulses φSEL1n, φSEL2n, φφSEL1n+1 and φSEL2n+1.

In each pixel, the floating diffusion amplifier is constituted by an FD 207, an amplification MOS amplifier 401, and a constant current source that is not illustrated. A voltage signal that depends on the amount of charge accumulated in the FD 207 of the pixel selected with the select switch 402 is read out to a column circuit 1001 (discussed later) of the readout circuitry 103 through a column output line 403. When reset switches 404a to 404d are respectively driven by reset pulses φRES1n, φRES2n, φRES1n+1 and φRES2n+1 and turned on, the FD 207 is reset by a power supply voltage VDD. Note that "n" and "n+1" on the end of the reference signs of the respective drive pulses are row numbers, and indicate that driving is performed by the nth (or n+1th) drive pulse counting from the first row.

Figure 3:
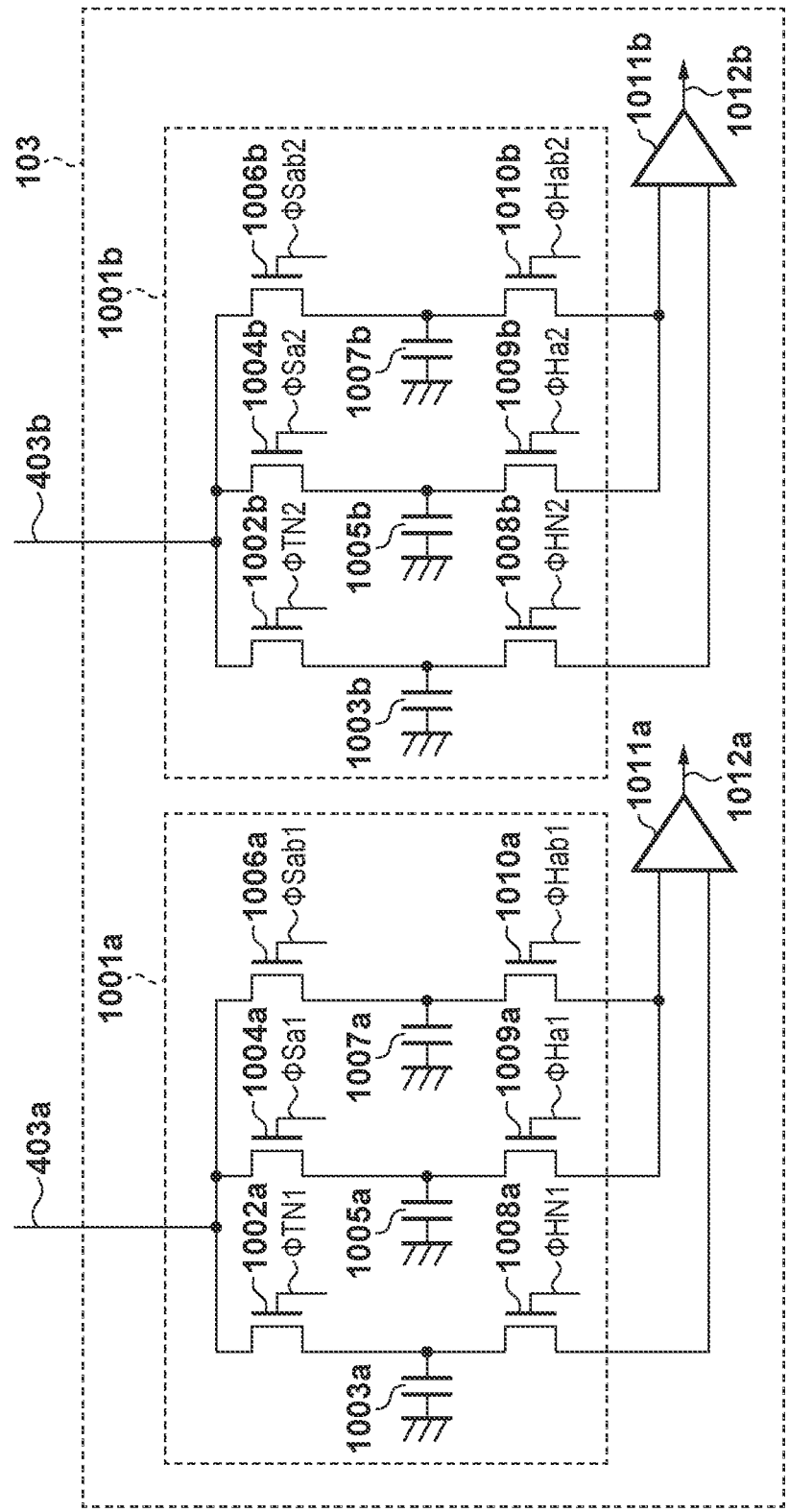
FIG. 3 is an equivalent circuit diagram showing an exemplary configuration of a readout circuitry according to an embodiment.

FIG. 3 is an equivalent circuit diagram showing an exemplary configuration of the readout circuitry 103.

The readout circuitry 103 has a column circuit 1001 that is disposed in each column, for example, and to which signals read out from the pixels on a column-by-column basis are input. Here, a column circuit 1001a processes signals from a column output line 403a to which the FDs 207a and 207c of FIG. 2 are connected, and a column circuit 1001b processes signals from a column output line 403b to which the FD 207b and 207d are connected.

Switches 1002a and 1002b are used in order to read out a reset signal of the FD 207. The switches 1002a and 1002b are respectively driven by control pulses φTN1 and φTN2 to store the reset signal, which is the potential of the FD 207 at the time of resetting output to the column output line 403, in capacitors 1003a and 1003b.

Switches 1004a and 1004b are used in order to read out a first PD signal, which is a combined signal of the signal of the PD 203 and a noise signal. The switches 1004a and 1004b are respectively driven by control pulses φSa1 and φSa2 to store the first PD signal output to the column output line 403 in capacitors 1005a and 1005b.

Switches 1006a and 1006b are used in order to read out a second PD signal, which is a combined signal of the signals of the PD 203 and the PD 204 and a noise signal or a combined signal of the signal of the PD 209 and a noise signal. The switches 1006a and 1006b are respectively driven by control pulses φSab1 and φSab2 to store the second PD signal output to the column output line 403 in capacitors 1007a and 1007b.

The potentials (signals) stored in the capacitors 1003a, 1005a and 1007a are read out via switches 1008a, 1009a and 1010a that are controlled using drive pulses φHN1, φHa1 and φHab1 from the column select circuitry 104. A readout amplifier 1011a that has one input connected to the switch 1008a and the other input connected to the switches 1009a and 1010a outputs the difference of the input signals to an external output signal row 1012a.

Similarly, the signals stored in the capacitors 1003b, 1005b and 1007b are read out via the switches 1008b, 1009b and 1010b that are controlled using drive pulses φHN2, φHa2 and φHab2 from the column select circuitry 104. A readout amplifier 1011b that has one input connected to the switch 1008b and the other input connected to the switches 1009b and 1010b outputs the difference of the input signals to an external output signal row 1012b.

Specifically, in the case where the switches 1008 and 1009 are turned on, the difference of the signal stored in the capacitor 1005 and the signal stored in the capacitor 1003, that is, the signal of the PD 203, is output. Also, in the case where switches 1008 and 1010 are turned on, the difference of the signal stored in the capacitor 1007 and the signal stored in the capacitor 1003, that is, a combined signal of the signals of the PD 203 and the PD 204 or the signal of the PD 209 is output. Note that the column circuit 1001 may have a gain amplifier, an A/D converter, and the like. Also, the readout amplifier 1011 does not need to be provided every column, and may be shared between a plurality of columns.

Drive Method

Next, the drive (readout) method of the image sensor in the present embodiment will be described.

Figure 4:
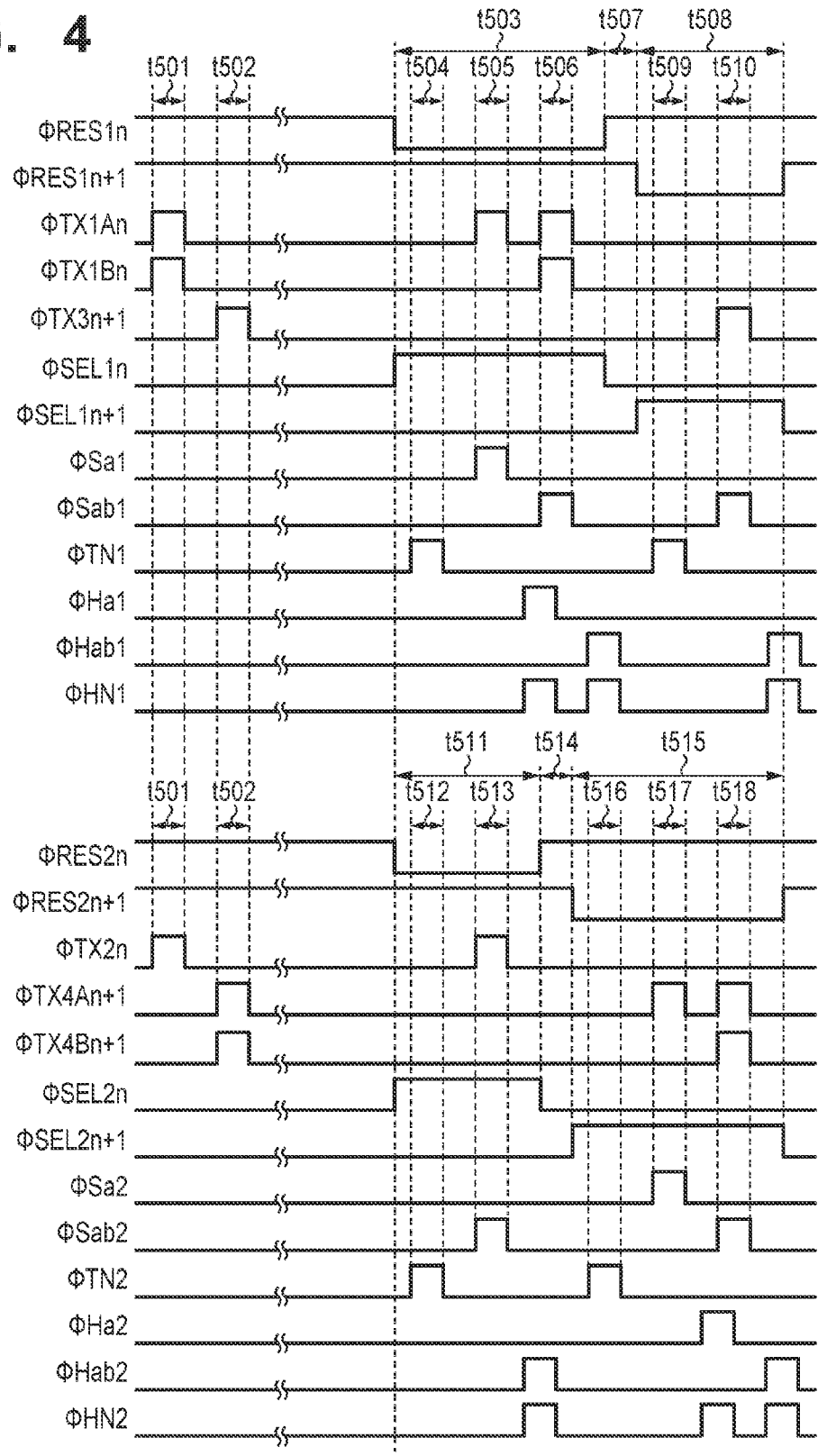
FIG. 4 is a timing chart for realizing a readout operation in the first embodiment.

FIG. 4 is an example of a timing chart of the drive pulses in the present embodiment. Here, it is assumed that signals are read out from the 2 (row)×2 (column) pixels shown in FIG. 2, and the names of the drive pulses are also based on FIG. 2. Although the various drive pulses that are illustrated are generated by the control circuit 106 controlling the timing generator 107, in the following description, the control circuit 106 is described as generating the drive pulses.

First, timing control of the drive pulses at the time of reading out signals from the 1 (column)×2 (row) pixels on the left in FIG. 2 (pixels 201a and 208c) will be described. In period t501, the control circuit 106 sets the drive pulses φRES1n, φTX1An and φTX1Bn to a high potential (hereinafter, "high") at the same time. The reset switch 404a and the transfer switches 205a and 206a are thereby turned on, and the potentials of the PD 203a, the PD 204a and the FD 207a are reset to an initial potential by the power supply voltage VDD. Thereafter, the control circuit 106 sets the drive pulses φTX1An and φTX1Bn to a low potential (hereinafter, "low") to start charge accumulation in the PDs 203a and 204a. Similarly, the control circuit 106 sets the drive pulses φRES1*n* and φTX3*n*+1 to high at the same time in period t502 to turn on the reset switch 404*c* and the transfer switch 210*c*. The potentials of the PD 209*c* and the FD 207*c* are thereby reset to an initial potential by the power supply voltage VDD. Thereafter, the control circuit 106 sets the drive pulse φTX3*n*+1 to low to start charge accumulation in the PD 209*c*.

In order to equalize the charge accumulation times of the PDs 203*a* and 204*a* and the PD 209*c* that exist in separate pixel rows and have different readout timings, the reset timings are differentiated.

After the elapse of a predetermined time based on the charge accumulation time, the control circuit 106 sets the drive pulse φSEL1*n* to high in period t503, and turns on the select switch 402*a* of the pixel 201*a*. It thereby becomes possible to read out the signal from the FD 207*a* through the column output line 403*a*. Note that the control circuit 106 sets the drive pulse φRES1*n* to low in period t503 to cancel resetting of the FD 207*a*. The signal is read out from the focus detection pixel in period t503.

At a delay from the start of period t503, the control circuit 106, in period t504, sets the drive pulse φTN1 of the readout circuitry 103 to high to turn on the switch 1002*a*. The signal at the time of resetting the FD 207*a* (noise signal) is thereby stored in the capacitor 1003*a*. The readout circuitry 103 reads out the potential of the FD 207*a* through the column output line 403*a*, based on control of the drive pulses φTN1, φSa1 and φSab1, and stores the potential in respectively different capacitors.

Next, in period t505, the control circuit 106 sets the drive pulses φTX1A*n* and φSa1 to high at the same time, and turns on the transfer switch 205*a* and the switch 1004*a*. The first PD signal, which is a combined signal of the signal of the PD 203*a* and the noise signal, is thereby stored in the capacitor 1005*a*.

After the elapse of period t505 and before the start of period t506, the control circuit 106 sets the drive pulses φHN1 and φHa1 to high, and outputs the signal of the PD 203 (signal obtained by subtracting the noise signal from the first PD signal) from the readout amplifier 1011*a*. As described above, the readout circuitry 103 sequentially outputs the noise signal, the first PD signal and the second PD signal, based on control of the drive pulses φHN1, φHa1 and φHab1.

Next, in a state where the reset switch 404*a* is not turned on (state where φRES1*n* is low), the control circuit 106 sets the drive pulses φTX1A*n*, φTX1B*n* and φSab1 to high at the same time in period t506, and turns on the transfer switches 205*a* and 206*a* and the switch 1006*a*. The second PD signal, which is a combined signal of the signals of the PD 203*a* and the PD 204*a* and the noise signal, is thereby stored in the capacitor 1007*a*. Because the control circuit 106 sets the drive pulse φTX1A*n* to high in period t505 to read out the signal of the PD 203*a* to the FD 207*a*, the drive pulse φTX1A*n* may be kept low in period t506. Strictly speaking, the accumulation time is from the end of period t501 until the end of period t506.

After the elapse of period t506, the control circuit 106 sets the drive pulses φHN1 and φHab1 to high to start output of the difference of the noise signal and the second PD signal from the readout circuitry 103.

The noise signal, the first PD signal and the second PD signal read out by the readout circuitry 103 are thus stored in the separate capacitors (storage units) 1003*a* and 1005*a* and 1007*a*. A signal (called an A image signal) obtained by subtracting the noise signal from the first PD signal and a signal (called an imaging signal) obtained by subtracting the noise signal from the second PD signal are then output via the readout amplifier 1011*a*. Since the first PD signal is the signal of the PD 203*a* and the imaging signal is a combined signal of the signals of the PD 203*a* and the PD 204*a*, the signal (called a B image signal) of the PD 204*a* can be obtained by subtracting the A image signal from the imaging signal. The A image signal and the B image signal are signals to be used in performing focus detection with a phase difference detection method.

Next, in period t507, the control circuit 106 sets the control pulse φRES1*n* to high to turn on the reset switch 404*a*. The FD 207*a* is thereby reset.

Thereafter, at the start of period t508, the control circuit 106 sets the control pulse φSEL1*n*+1 to high and turning on the select switch 402*c* to select the n+1th row and starts the readout operation of the signal of the next row. Also, at the same time, the control circuit 106 sets the drive pulse φRES1*n*+1 to low to cancel resetting of the FD 207*c*. In period t508, the control circuit 106 reads out the signal of the imaging pixel.

In period t509 after the start of period t508, the control circuit 106 sets the control pulse φTN1 to high, reads out the signal at the time of resetting the FD 207*c* (noise signal), and stores the noise signal in the capacitor 1003*a*.

Thereafter, in period t510, the control circuit 106 sets the drive pulses φTX3*n*+1 and φSab1 to high at the same time to turn on the transfer switch 210*c* and the switch 1006*a*. A combined signal of the signal of the PD 209*c* and the noise signal is thereby stored in the capacitor 1007*a*. This combined signal, being similar to the second PD signal that is read out from the focus detection pixel, will, for convenience, be called the second PD signal.

After the elapse of period t510, the control circuit 106 sets the control pulses φHN1 and φHab1 to high. The signal of the PD 209*c*, which is obtained by subtracting the noise signal from the second PD signal, is thereby output from the readout amplifier 1011*a*.

Next, timing control of the drive pulses at the time of reading out signals from the 1 (column)×2 (row) pixels on the right in FIG. 2 (pixels 208*b* and 201*d*) will be described. In period t501, the control circuit 106 sets the drive pulses φRES2*n* and φTX2*n* to high at the same time. The reset switch 404*b* and the transfer switch 210*b* are thereby turned on, and the potentials of the PD 209*b* and the FD 207*b* are reset to an initial potential by the power supply voltage VDD. Thereafter, the control circuit 106 sets the drive pulse φTX2*n* to low to start charge accumulation in the PD 209*b*. Similarly, the control circuit 106 sets the drive pulses φRES2*n*+1, φTX4A*n*+1 and φTX4B*n*+1 to high at the same time in period t502 to turn on the reset switch 404*d* and the transfer switches 205*d* and 206*d*. The potentials of the PD 203*d*, the PD 204*d* and the FD 207*d* are thereby reset to an initial potential by the power supply voltage VDD. Thereafter, the control circuit 106 sets the drive pulses φTX4A*n*+1 and φTX4B*n*+1 to low and starts charge accumulation in the PD 203*d* and the PD 204*d*.

In order to equalize the charge accumulation times of the PD 209*b* and the PDs 203*d* and 204*d* that exist in separate pixel rows and have different readout timings, the reset timings are differentiated.

After the elapse of a predetermined time based on the charge accumulation time, the control circuit 106 sets the drive pulse φSEL2*n* to high in period t511, and turns on the select switch 402*b* of the imaging pixel 208*b*. It thereby becomes possible to read out the signal from the FD 207*b* through the column output line 403*b*. Note that the control circuit 106 sets the drive pulse φRES2*n* to low in period t511 to cancel resetting of the FD 207b. The signal is read out from the imaging pixel in period t511.

At a delay from the start of period t511, the control circuit 106, in period t512, sets the drive pulse φTN2 of the readout circuitry 103 to high to turn on the switch 1002b. The signal at the time of resetting the FD 207b (noise signal) is thereby stored in the capacitor 1003b. In period t513, the control circuit 106, by setting the drive pulses Tx2n and φSab2 to high and turning on the transfer switch 210b and the switch 1004b, stores the second PD signal, which is a combined signal of the signal of the PD 209b and the noise signal, in the capacitor 1005b.

After the elapse of period t513, the control circuit 106 sets the control pulses φHN2 and φHab2 to high. The signal of the PD 209b, which is obtained by subtracting the noise signal from the second PD signal, is thereby output from the readout amplifier 1011a. Note that the timing at which signals are stored in the capacitors within the readout circuitry 103 differs between the pixels 201a and 208c in the column on the left side in FIG. 2 and the pixels 208b and 201d in the column on the right side. Thus, the timing and control of the control pulses φHN1, φHa1 and φHab1 and φHN2, φHa2 and φHab2 that control the output timing of the readout circuitry 103 also differ from each other.

Next, the control circuit 106 sets the drive pulse φRES2n to high at the start of period t514 to turn on the reset switch 404b. The potential of the FD 207b is thereby reset to an initial potential by the power supply voltage VDD.

Next, at the start of period t515, the control circuit 106 sets the drive pulse φSEL2n+1 to high, and turns on the select switch 402d of the pixel 201d. It thereby becomes possible to read out the signal of the FD 207d through the column output line 403b. Note that the control circuit 106 sets the drive pulse φRES2n+1 to low at the start of period t515 to cancel resetting of the FD 207d. The signal is read out from the focus detection pixel in period t515.

At a delay from the start of period t515, the control circuit 106, in period t516, sets the drive pulse φTN2 of the readout circuitry 103 to high to turn on the switch 1002b. The signal at the time of resetting the FD 207d (noise signal) is thereby stored in the capacitor 1003b.

Next, in period t517, the control circuit 106 sets the drive pulses φTX4An+1 and φSa2 to high at the same time, and turns on the transfer switch 205d and the switch 1004b. The first PD signal, which is a combined signal of the signal of the PD 203d and the noise signal, is thereby stored in the capacitor 1005b.

After the elapse of period t517 and before the start of period t518, the control circuit 106 sets the drive pulses φHN2 and φHa2 to high, and outputs the signal of the PD 203d (signal obtained by subtracting the noise signal from the first PD signal) from the readout amplifier 1011b.

Next, in a state where the reset switch 404d is not turned on (state where φRES2n+1 is low), the control circuit 106 sets the drive pulses φTX4An+1, φTX4Bn+1 and φSab2 to high at the same time in period t518. The transfer switches 205d and 206d and the switch 1006b are thereby turned on, and the second PD signal, which is a combined signal of the signal of the PD 203d, the signal of the PD 204d and the noise signal, is stored in the capacitor 1007b. Because the control circuit 106 sets the drive pulse φTX4An+1 to high in period t517 to read out the signal of the PD 203d to the FD 207d, the drive pulse φTX4An+1 may be kept low in period t518.

After the elapse of period t518, the control circuit 106 sets the drive pulses φHN2 and φHab2 to high to start output of the difference of the noise signal and the second PD signal from the readout circuitry 103.

The noise signal, the first PD signal and the second PD signal read out by the readout circuitry 103 are thus stored in separate capacitors (storage units) 1003b, 1005b and 1007b. A signal (called an A image signal) obtained by subtracting the noise signal from the first PD signal and a signal (called an imaging signal) obtained by subtracting the noise signal from the second PD signal are then output via the readout amplifier 1011b. Since the first PD signal is the signal of the PD 203d, and the imaging signal is a combined signal of the signals of the PD 203d and the PD 204d, the signal of the PD 204d (called a B image signal) can be obtained by subtracting the A image signal from the imaging signal.

In the case of the imaging pixel, the first PD signal does not need to be read out. Thus, by differentiating drive control between the focus detection pixels and the imaging pixels, it becomes possible to shorten the readout time of the imaging pixels, and therefore becomes possible to shorten the overall readout time.

Figures 5A, 5B, 5C:
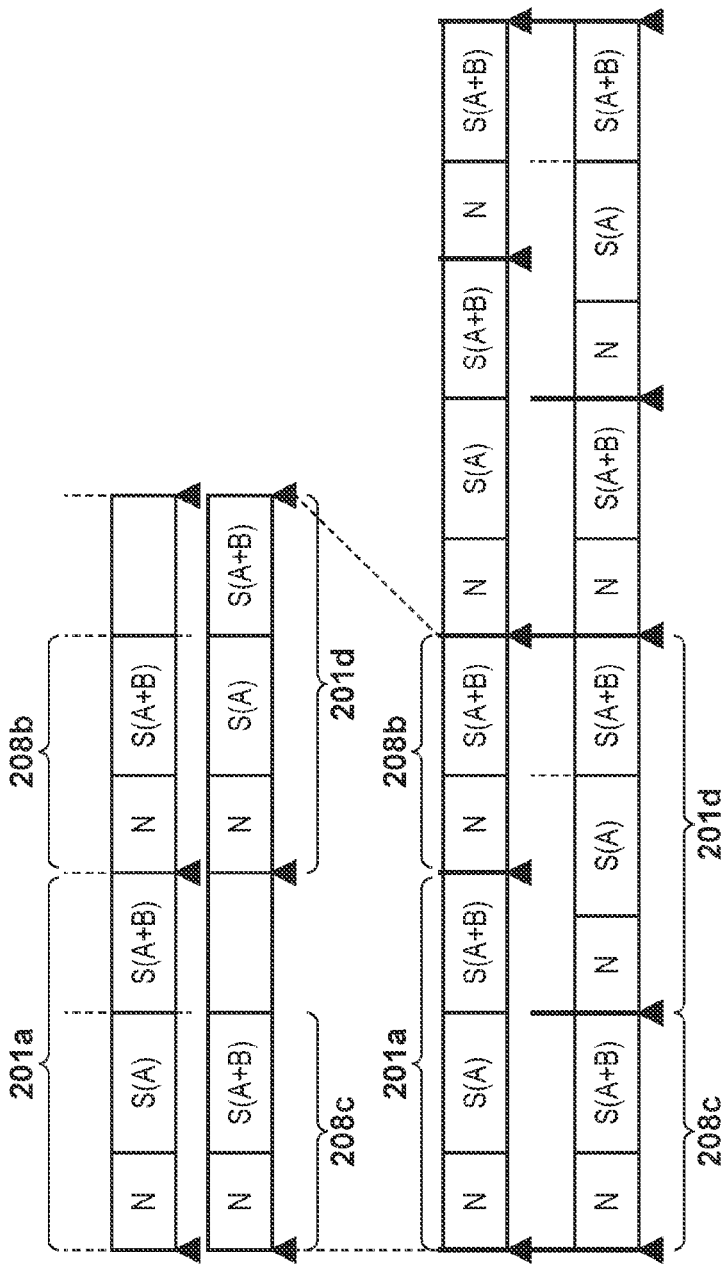
FIGS. 5A to 5C are diagrams for describing effects of the first embodiment.

The effects of the present embodiment will be described using FIGS. 5A to 5C. FIG. 5A schematically shows the relationship between the elapse of time and the readout operation in the case of reading out signals using the same timing control (same group of drive signals) with regard to pixel rows having the arrangements of focus detection pixels and imaging pixels shown in FIG. 2. In FIGS. 5A to 5C, the triangular marks indicate the reset timing. Also, N indicates reading out of the noise signal, S(A) indicates reading out of the signal of the PD 203, and S(A+B) indicates reading out of an imaging signal (combined signal of PDs 203 and 204 or signal of PD 209). In this case, as a result of waiting for signal readout of the focus detection pixel in one arrangement pattern to end before starting signal readout of the focus detection pixel in the other arrangement pattern, unnecessary waiting time occurs from the completion of signal readout of the imaging pixel until the start of signal readout of the focus detection pixel.

In the case of FIG. 5A, the required readout time is determined by the number of the focus detection pixels that exist in different positions in the readout direction. In other words, as shown in FIG. 5A, the required readout time will be the total time required to readout the signals of the focus detection pixels 201a and 201d. Accordingly, in the case where focus detection pixels and imaging pixels are arranged alternately in the signal readout direction, and there exist rows in which the arrangement order thereof is reversed, a signal readout time equivalent to a row constituted only by focus detection pixels (upper row in FIG. 5C) will be required.

On the other hand, according to the present embodiment, in the case where there exist a plurality of arrangement patterns of focus detection pixels and imaging pixels in the signal readout direction, the timing control is differentiated according to the arrangement pattern. Thus, as shown in FIG. 5B, the signal readout of one arrangement pattern is not affected by the signal readout of the other arrangement pattern. Accordingly, it is not necessary to wait for the signal readout of the focus detection pixel in one arrangement pattern to end before starting the signal readout of the focus detection pixel in the other arrangement pattern. In the example in FIG. 2, the nth row has a focus detection pixel-imaging pixel arrangement pattern, and the n+1th row has an imaging pixel-focus detection pixel arrangement pattern. Signal readout is performed at independent drive timings for the respective patterns, and is thus not affected by the signal readout timing of pixel rows having a different arrangement pattern. Accordingly, signal readout can be performed at timings suitable for the individual arrangement patterns, and efficient signal readout that eliminates wasted time becomes possible.

The present embodiment is also advantageous in terms of image quality. For example, the case where the pixel array 101 of the image sensor is constituted by a row (AF row) that is constituted only by focus detection pixels and a row (non-AF row) that is constituted only by imaging pixels, such as is shown in FIG. 5C, will be considered. In this case, even though the readout timing of the reset signal (N) is the same for the AF row and the non-AF row, the time from when the reset signal is read out until when the imaging signal (S(A+B)) is read out differs (the AF row is takes longer). On the other hand, this configuration is characterized in that noise in the imaging signal increases as the time from reading out of the reset signal until reading out of the imaging signal becomes longer. This is because the correlation of the signals decreases as the time from reading out of the reset signal until reading out of the imaging signal becomes longer, and thus the degree of reliability of the reset signal that is subtracted from the imaging signal decreases. As a result, noise in the imaging signals read out from the AF row increases relative to noise in the imaging signals read out from the non-AF row, giving rise to the problem that noise in the AF row becomes noticeable. For example, in the case where a plurality of AF rows are provided successively in correspondence with the focus detection area, an image in which streak noise occurs in the AF row portion will be generated.

However, in the present embodiment, focus detection pixels and imaging pixels are intermixed within the same row, and there is no division between AF rows and non-AF rows. Thus, noise in the focus detection pixels caused by the difference in time from reading out of the reset signal until reading out of the imaging signal between the focus detection pixels and the imaging pixels is distributed and tends not to be noticeable. Particularly in the present embodiment in which there exist a plurality of arrangement patterns of the focus detection pixels and the imaging pixels, noise is further distributed. This effect is enhanced in the case where the positions of focus detection pixels do not coincide between arrangement patterns, and where the same arrangement patterns are disposed so as to not be adjacent.

Second Embodiment

Next, a second embodiment of the present invention will be described.

Figure 6:
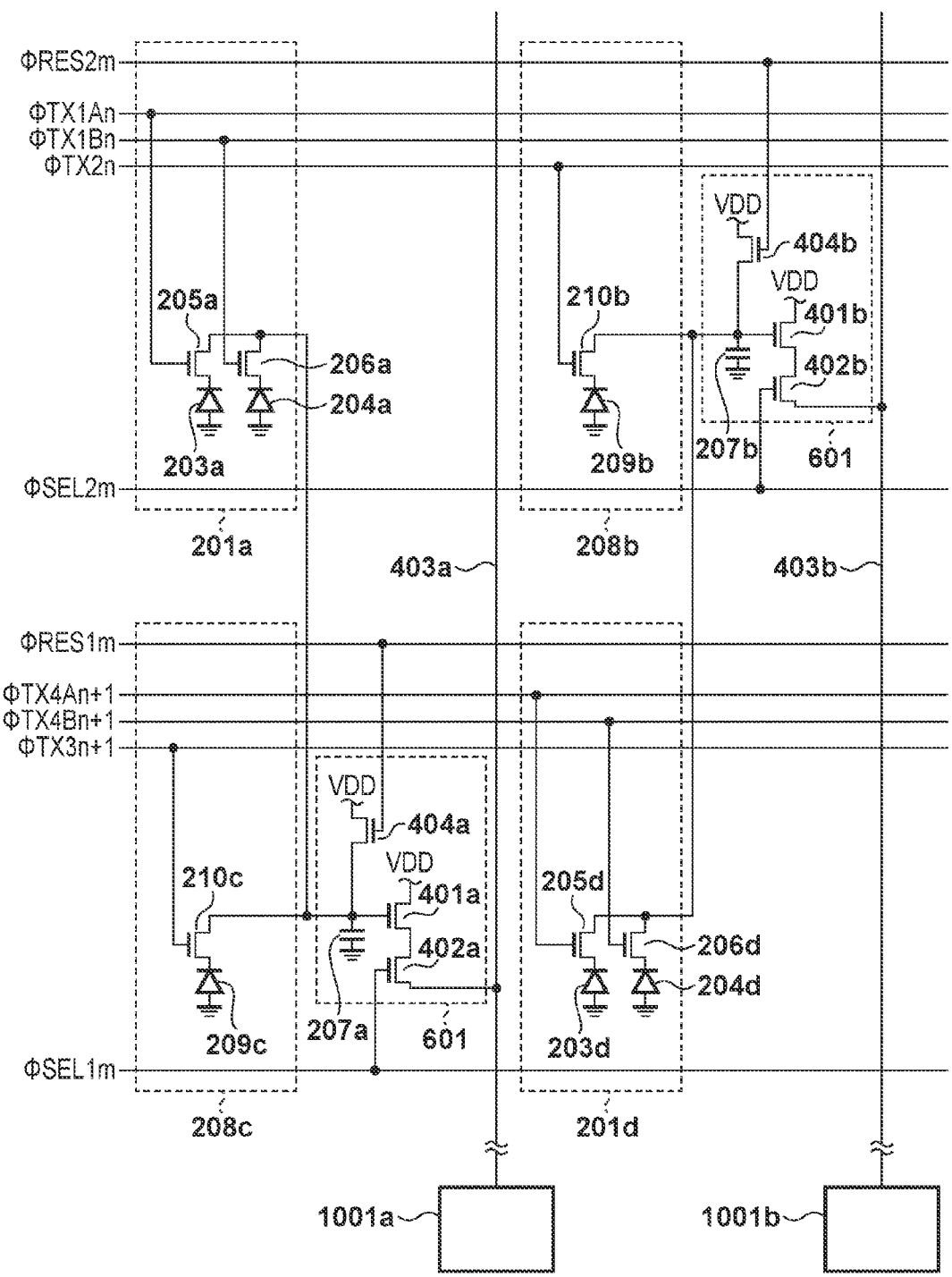
FIG. 6 is an equivalent circuit diagram showing an exemplary configuration of part of a pixel array in a second embodiment.

FIG. 6 is an equivalent circuit diagram similar to FIG. 2, and the same reference signs are given to constituent elements that are the same as FIG. 2. The present embodiment is characterized in that a configuration in which the circuitry related to reset, accumulation and readout are shared between two pixels adjacent in the vertical direction, excluding the photoelectric conversion portions (PD) and the switches for charge transfer.

In FIG. 6, the pixels 201a and 201d are focus detection pixels, and the pixels 208b and 208c are imaging pixels. By sharing the circuit 601 between the focus detection pixel 201 and the imaging pixel 208 that are adjacent in the vertical direction (column direction), the number of circuits within the pixels is reduced, enabling an improvement in the opening ratio and an expansion of the areas of the PD 203, the PD 204 and the PD 209 to be realized.

Note that since the constituent elements of the equivalent circuit in FIG. 6, including the shared portion, are the same as FIG. 2, description thereof will be not be given. The circuit configuration differs between the present embodiment and the first embodiment in the following respects. In the present embodiment, charge is transferred from the PDs 203a, 204a and 209c to the FD 207a by the transfer switches 205a, 206a and 210c. Also, charge is transferred from the PDs 209b, 203d and 204d to the FD 207b by the transfer switches 210b, 205d and 206d. The number of reset pulses φRES and selection pulses φSEL (signals and wiring) is one.

Note that the circuit configuration of the readout circuitry 103 in the present embodiment is the same as the first embodiment (FIG. 3).

Drive Method

Next, the drive (readout) method of the image sensor in the present embodiment will be described.

Figure 7:
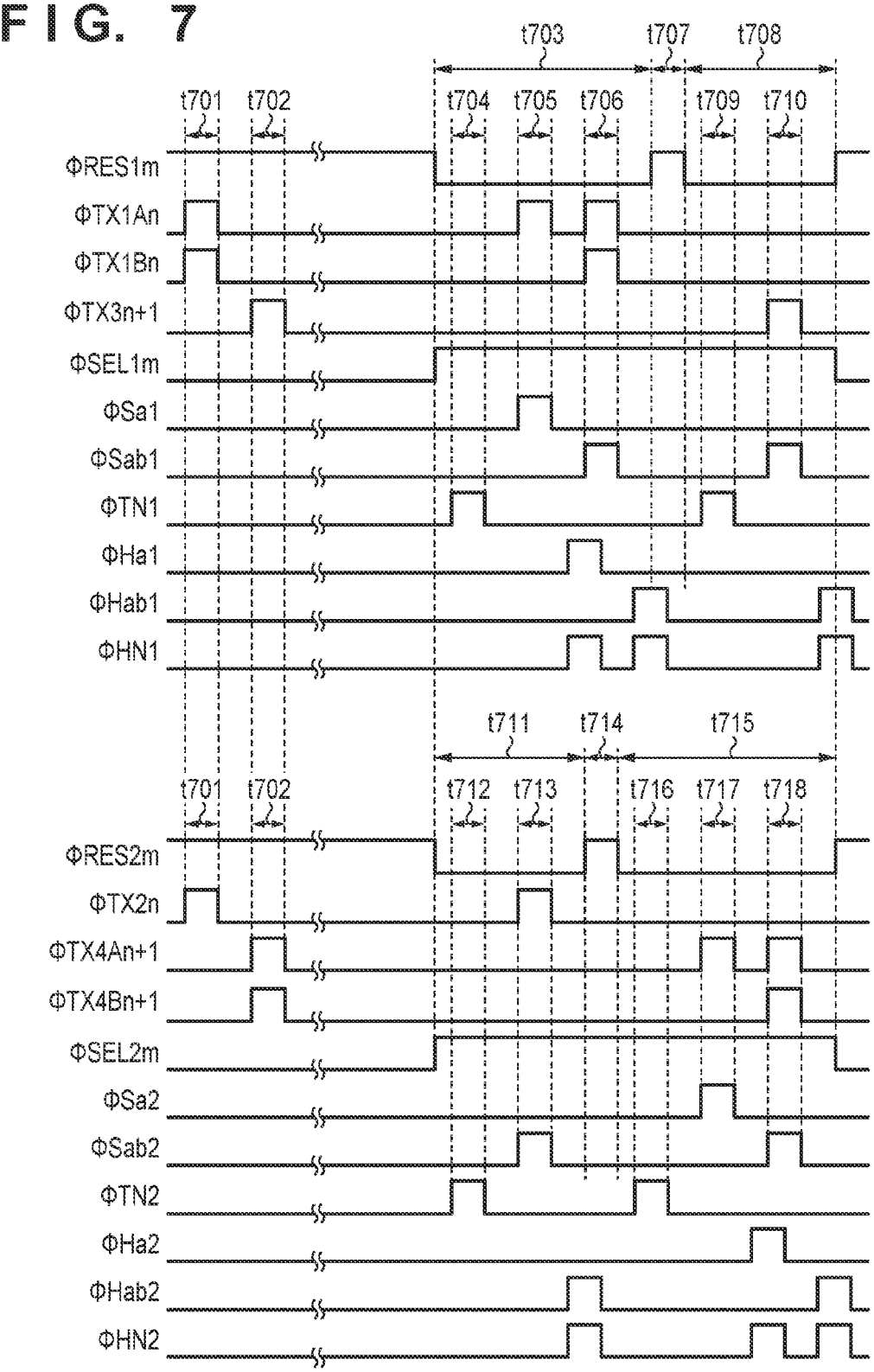
FIG. 7 is a timing chart for realizing a readout operation in the second embodiment.

FIG. 7 is an example of a timing chart of the drive pulses in the present embodiment. Here, it is assumed that signals are to be read out of the 2 (row)×2 (column) of pixels shown in FIG. 6, and the reference signs of the drive pulses are also based on FIG. 6. Although the various drive pulses that are illustrated are generated by the control circuit 106 controlling the timing generator 107, in the following description, the control circuit 106 is described as generating the drive pulses.

First, timing control of the drive pulses at the time of reading out signals from the 1 (column)×2 (row) pixels on the left in FIG. 6 (pixels 201a and 208c) will be described. In period t701, the control circuit 106 sets the drive pulses φRES1m, φTX1An and φTX1Bn to high at the same time. The reset switch 404a and the transfer switches 205a and 206a are thereby turned on, and the potentials of the PD 203a, the PD 204a and the FD 207a are reset to an initial potential by the power supply voltage VDD. Thereafter, the control circuit 106 sets the drive pulses φTX1An and φTX1Bn to low to start charge accumulation in the PDs 203a and 204a.

Similarly, the control circuit 106 sets the drive pulses φRES1m and φTX3n+1 to high at the same time in period t702 to turn on the reset switch 404a and the transfer switch 210c. The potentials of the PD 209c and the FD 207a are thereby reset to an initial potential by the power supply voltage VDD. Thereafter, the control circuit 106 sets the drive pulse φTX3n+1 to low to start charge accumulation in the PD 209c.

In order to equalize the charge accumulation times of the PDs 203a and 204a and the PD 209c that exist in separate pixel rows and have different readout timings, the reset timings are differentiated.

After the elapse of a predetermined time based on the charge accumulation time, the control circuit 106 sets the drive pulse φSEL1m to high in period t703, and turns on the select switch 402a. It thereby becomes possible to read out the signal from the FD 207a through the column output line 403a. Note that the control circuit 106 sets the drive pulse φRES1m to low in period t703 to cancel resetting of the FD 207a. The signal is read out from the focus detection pixel in period t703.

At a delay from the start of period t703, the control circuit 106, in period t704, sets the drive pulse φTN1 of the readout circuitry 103 to high to turn on the switch 1002a. The signal at the time of resetting the FD 207a (noise signal) is thereby stored in the capacitor 1003a. The readout circuitry 103 reads out the potential of the FD 207a through the column output line 403a, based on control of the drive pulses φTN1, φSa1 and φSab1, and stores the potential in respectively different capacitors.

Next, in period t705, the control circuit 106 sets the drive pulses φTX1An and φSa1 to high at the same time, and turns on the transfer switch 205a and the switch 1004a. The first PD signal, which is a combined signal of the signal of the PD 203a and the noise signal, is thereby stored in the capacitor 1005a.

After the elapse of period t705 and before the start of period t706, the control circuit 106 sets the drive pulses φHN1 and φHa1 to high, and outputs the signal of the PD 203 (signal obtained by subtracting the noise signal from the first PD signal) from the readout amplifier 1011a. As described above, the readout circuitry 103 sequentially outputs the noise signal, the first PD signal and the second PD signal, based on control of the drive pulses φHN1, φHa1 and φHab1.

Next, in a state where the reset switch 404a is not turned on (state where φRES1m is low), the control circuit 106 sets the drive pulses φTX1An, φTX1Bn and φSab1 to high at the same time in period t706, and turns on the transfer switches 205a and 206a and the switch 1006a. The second PD signal, which is a combined signal of the signals of the PD 203a and the PD 204a and the noise signal, is thereby stored in the capacitor 1007a. Because the control circuit 106 sets the drive pulse φTX1An to high in period t705 to read out the signal of the PD 203a to the FD 207a, the drive pulse φTX1An may be kept low in period t706. Strictly speaking, the accumulation time is from the end of period t701 until the end of period t706.

After the elapse of period t706, the control circuit 106 sets the drive pulses φHN1 and φHab1 to high to start output of the difference of the noise signal and the second PD signal from the readout circuitry 103.

The noise signal, the first PD signal and the second PD signal read out by the readout circuitry 103 are thus stored in the separate capacitors (storage units) 1003a and 1005a and 1007a. A signal (called an A image signal) obtained by subtracting the noise signal from the first PD signal and a signal (called an imaging signal) obtained by subtracting the noise signal from the second PD signal are then output via the readout amplifier 1011a. Since the first PD signal is the signal of the PD 203a and the imaging signal is a combined signal of the signals of the PD 203a and the PD 204a, the signal (called a B image signal) of the PD 204a can be obtained by subtracting the A image signal from the imaging signal.

Next, in period t707, the control circuit 106 sets the control pulse φRES1m to high to turn on the reset switch 404a. The FD 207a is thereby reset.

Thereafter, at the start of period t708, the control circuit 106 maintains the on state of the select switch 402a by keeping the control pulse φSEL1m high (n+1th row in selected state), and starts the readout operation of the signal of the next row (nth row). Also, at the same time, the control circuit 106 sets the drive pulse φRES1m to low to cancel resetting of the FD 207c. In period t708, the control circuit 106 reads out the signal of the imaging pixel.

In period t709 after the start of period t708, the control circuit 106 sets the control pulse φTN1 to high, reads out the signal at the time of resetting the FD 207a (noise signal), and stores the noise signal in the capacitor 1003a.

Thereafter, in period t710, the control circuit 106 sets the drive pulses φTX3n+1 and φSab1 to high at the same time to turn on the transfer switch 210c and the switch 1006a. A combined signal of the signal of the PD 209c and the noise signal is thereby stored in the capacitor 1007a. This combined signal, being similar to the second PD signal read out from the focus detection pixel, will, for convenience, be called the second PD signal.

After the elapse of period t710, the control circuit 106 sets the control pulses φHN1 and φHab1 to high. The signal of the PD 209c, which is obtained by subtracting the noise signal from the second PD signal, is thereby output from the readout amplifier 1011a.

Next, timing control of the drive pulses at the time of reading out signals from the 1 (column)×2 (row) pixels on the right in FIG. 6 (pixels 208b and 201d) will be described. In period t701, the control circuit 106 sets the drive pulses φRES2m and φTX2n to high at the same time. The reset switch 404b and the transfer switch 210b are thereby turned on, and the potentials of the PD 209b and the FD 207b are reset to an initial potential by the power supply voltage VDD. Thereafter, the control circuit 106 sets the drive pulse φTX2n to low to start charge accumulation in the PD 209b.

Similarly, the control circuit 106 sets the drive pulses φRES2m, φTX4An+1 and φTX4Bn+1 to high at the same time in period t702 to turn on the reset switch 404b and the transfer switches 205d and 206d. The potentials of the PD 203d, the PD 204d and the FD 207b are thereby reset to an initial potential by the power supply voltage VDD. Thereafter, the control circuit 106 sets the drive pulses φTX4An+1 and φTX4Bn+1 to low and starts charge accumulation in the PD 203d and the PD 204d.

In order to equalize the charge accumulation times of the PD 209b and the PDs 203d and 204d that exist in separate pixel rows and have different readout timings, the reset timings are differentiated.

After the elapse of a predetermined time based on the charge accumulation time, the control circuit 106 sets the drive pulse φSEL2m to high in period t711, and turns on the select switch 402b of the imaging pixel 208b. It thereby becomes possible to read out the signal from the FD 207b through the column output line 403b. Note that the control circuit 106 sets the drive pulse φRES2m to low in period t711 to cancel resetting of the FD 207b. The signal is read out from the imaging pixel in period t711.

At a delay from the start of period t711, the control circuit 106, in period t712, sets the drive pulse φTN2 of the readout circuitry 103 to high to turn on the switch 1002b. The signal at the time of resetting the FD 207b (noise signal) is thereby stored in the capacitor 1003b. In period t713, the control circuit 106, by setting the drive pulses Tx2n and φSab2 to high and turning on the transfer switch 210b and the switch 1004b, stores the second PD signal, which is a combined signal of the signal of the PD 209b and the noise signal, in the capacitor 1005b.

After the elapse of period t713, the control circuit 106 sets the control pulses φHN2 and φHab2 to high. The signal of the PD 209b, which is obtained by subtracting the noise signal from the second PD signal, is thereby output from the readout amplifier 1011a. Note that the timing at which signals are stored in the capacitors within the readout circuitry 103 differs between the pixels 201a and 208c in the column on the left side in FIG. 6 and the pixels 208b and 201d in the column on the right side. Thus, the timing and control of the control pulses φHN1, φHa1 and φHab1 and φHN2, φHa2 and φHab2 that control the output timing of the readout circuitry 103 also differ from each other.

Next, the control circuit 106 sets the drive pulse φRES2m to high at the start of period t714 to turn on the reset switch 404b. The potential of the FD 207b is thereby reset to an initial potential by the power supply voltage VDD.

Next, at the start of period t715, the control circuit 106 maintains the on state of the select switch 402b of the pixel 201d by keeping the control pulse φSEL2m high (nth row in selected state), and starts the readout operation of the signal of the next row (n+1th row). Note that the control circuit 106 sets the drive pulse φRES2m to low at the start of period t715 to cancel resetting of the FD 207b. The signal is read out from the focus detection pixel in period t715.

At a delay from the start of period t715, the control circuit 106, in period t716, sets the drive pulse φTN2 of the readout circuitry 103 to high to turn on the switch 1002b. The signal at the time of resetting the FD 207b (noise signal) is thereby stored in the capacitor 1003b.

Next, in period t717, the control circuit 106 sets the drive pulses φTX4An+1 and φSa2 to high at the same time, and turns on the transfer switch 205d and the switch 1004b. The first PD signal, which is a combined signal of the signal of the PD 203d and the noise signal, is thereby stored in the capacitor 1005b.

After the elapse of period t717 and before the start of period t718, the control circuit 106 sets the drive pulses φHN2 and φHa2 to high, and outputs the signal of the PD 203d (signal obtained by subtracting the noise signal from the first PD signal) from the readout amplifier 1011b.

Next, in a state where the reset switch 404b is not turned on (state where φRES2m is low), the control circuit 106 sets the drive pulses φTX4An+1, φTX4Bn+1 and φSab2 to high at the same time in period t718. The transfer switches 205d and 206d and the switch 1006b are thereby turned on, and the second PD signal, which is a combined signal of the signal of the PD 203d, the signal of the PD 204d and the noise signal, is stored in the capacitor 1007b. Because the control circuit 106 sets the drive pulse φTX4An+1 to high in period t717 to read out the signal of the PD 203d to the FD 207b, the drive pulse φTX4An+1 may be kept low in period t718.

After the elapse of period t718, the control circuit 106 sets the drive pulses φHN2 and φHab2 to high to start output of the difference of the noise signal and the second PD signal from the readout circuitry 103.

The noise signal, the first PD signal and the second PD signal read out by the readout circuitry 103 are thus stored in separate capacitors (storage units) 1003a, 1005a and 1007a. A signal (called an A image signal) obtained by subtracting the noise signal from the first PD signal and a signal (called an imaging signal) obtained by subtracting the noise signal from the second PD signal are then output via the readout amplifier 1011a. Since the first PD signal is the signal of the PD 203a, and the imaging signal is a combined signal of the signals of the PD 203a and the PD 204a, the signal of the PD 204a (called a B image signal) can be obtained by subtracting the A image signal from the imaging signal.

According to the present embodiment, a configuration was adopted in which circuitry related to reset, charge accumulation and readout are shared between two adjacent pixels in the circuit configuration of a pixel array according to the first embodiment. Thus, in addition to the effects according to the first embodiment, effects that result from reducing the number of circuit elements, such as the effect of it becoming possible to enlarge the area of the photoelectric conversion region, for example, can be realized.

Variations

A different drive method for a pixel array having the circuit configuration of FIG. 6 will be described.

FIG. 8 is a timing chart showing a variation of the drive method of the second embodiment. Note that the same reference signs as FIG. 7 are given to portions that are the same as the drive operation described using FIG. 7, and description thereof will be omitted. Although the various drive pulses that are illustrated are generated by the control circuit 106 controlling the timing generator 107, in the following description, the control circuit 106 is described as generating the drive pulses.

First, timing control of the drive pulses at the time of reading out signals from the 1 (column)×2 (row) pixels on the left in FIG. 6 (pixels 201a and 208c) will be described. In the periods t701 and t702, the PDs 203a, 204a and 209c and the FD 207a are reset to an initial potential.

After the elapse of a predetermined time based on the charge accumulation time, the control circuit 106 sets the drive pulse φSEL1m to high in period t801, and turns on the select switch 402a. It thereby becomes possible to read out the signal of the FD 207a through the column output line 403a. Note that the control circuit 106 sets the drive pulse φRES1m to low at the start of period t801 to cancel resetting of the FD 207a. The signal is read out from the focus detection pixel in period t801.

At a delay from the start of period t801, the control circuit 106, in period t802, sets the drive pulse φTN1 of the readout circuitry 103 to high to turn on the switch 1002a. The signal at the time of resetting the FD 207a (first noise signal) is stored in the capacitor 1003a.

Next, in period t803, the control circuit 106 sets the drive pulses φTX1An and φSa1 to high at the same time, and turns on the transfer switch 205a and the switch 1004a. The first PD signal, which is a combined signal of the signal of the PD 203a and the first noise signal, is stored in the capacitor 1005a.

After the elapse of period t803 and before the start of period t804, the control circuit 106 sets the drive pulses φHN1 and φHa1 to high, and outputs the signal of the PD 203a (signal obtained by subtracting the noise signal from the first PD signal) from the readout amplifier 1011a. As described above, the readout circuitry 103 sequentially outputs the first noise signal, a second noise signal, and the first to third PD signals, based on control of the drive pulses φHN1, φHa1 and φHab1.

Next, in period t804, the control circuit 106, as preparation for outputting the next signal, sets the drive pulse φRES1m to high to turn on the reset switch 404a, and resets the FD 207a. After the elapse of period t804, the control circuit 106 sets φRES1m to low to cancel resetting of the FD 207a.

In period t805, the control circuit 106 sets the drive pulse φTN1 to high to turn on the switch 1002a, and reads out and stores the signal at the time of resetting the FD 207a (second noise signal) in the capacitor 1003a. Since the state of the FD 207a differs between period t802 and period t805, the first noise signal and the second noise signal have different values.

Next, the control circuit 106 sets the control pulses φTX1Bn and φSa1 to high at the same time in period t806 to turn on the transfer switch 206a and the switch 1004a. The third PD signal, which is a combined signal of the signal of the PD 204a and the second noise signal, is thereby stored in the capacitor 1005a.

After the elapse of period t806 and before the start of period t707, the control circuit 106 sets the drive pulses φHN1 and φHa1 to high, and outputs the signal of the PD 204a (signal obtained by subtracting the second noise signal from the third PD signal) from the readout amplifier 1011a.

In this way, the first noise signal and the second noise signal read out by the readout circuitry 103 are stored in the capacitor 1003a, the first and third PD signals are stored in the capacitor 1005a, and the second PD signal is stored in the capacitor 1007a. The signal (A image signal) obtained by subtracting the first noise signal from the first PD signal and the signal (B image signal) obtained by subtracting the second noise signal from the third PD signal are then output via the readout amplifier 1011a. Since the imaging signal is a combined signal of the signals of the PD 203a and the PD 204a, the imaging signal can be obtained by combining the A image signal and the B image signal.

Since readout control of the imaging pixel 208c from period t707 onward is similar to FIG. 7, description thereof will be omitted.

Next, timing control of the drive pulses at the time of reading out signals from the 1 (column)×2 (row) pixels on the right in FIG. 6 (pixels 208b and 201d) will be described. In the periods t701 and t702, the PDs 209b, 203d and 204d and the FD 207b are reset to an initial potential.

Since the operations related to reading out of the imaging pixel 208b and resetting of the FD 207b that are implemented in periods t711 and t714 after the elapse of a predetermined time based on the charge accumulation time are the same as FIG. 7, description thereof will be omitted.

The control circuit 106 sets the drive pulse φSEL2m to high in period t807, and turns on the select switch 402b. It thereby becomes possible to read out the signal of the FD 207b through the column output line 403b. Note that the control circuit 106 sets the drive pulse φRES2m to low at the start of period t807 to cancel resetting of the FD 207a. The signal is read out from the focus detection pixel in period t807.

At a delay from the start of period t807, the control circuit 106, in period t808, sets the drive pulse φTN2 of the readout circuitry 103 to high to turn on the switch 1002b. The signal at the time of resetting the FD 207b (first noise signal) is thereby stored in the capacitor 1003a.

Next, in period t809, the control circuit 106 sets the drive pulses φTX4An+1 and φSa2 to high at the same time, and turns on the transfer switch 205d and the switch 1004b. The first PD signal, which is a combined signal of the signal of the PD 203d and the first noise signal, is thereby stored in the capacitor 1005a.

After the elapse of period t809 and before the start of period t810, the control circuit 106 sets the drive pulses φHN2 and φHa2 to high, and outputs the signal of the PD 203d (signal obtained by subtracting the noise signal from the first PD signal) from the readout amplifier 1011b.

Next, in period t810, the control circuit 106, as preparation for outputting the next signal, sets the drive pulse φRES2m to high to turn on the reset switch 404b, and resets the FD 207b. After the elapse of period t810, the control circuit 106 sets φRES2m to low to cancel resetting of the FD 207b.

In period t811, the control circuit 106 sets the drive pulse φTN2 to high to turn on the switch 1002b, reads out and stores the signal at the time of resetting the FD 207b (second noise signal) in the capacitor 1003a. Since the state of the FD 207b differs between period t808 and period t811, the first noise signal and the second noise signal have different values.

Next, in period t812, the control circuit 106 sets the control pulses φTX4Bn and φSa2 to high at the same time to turn on the transfer switch 206d and the switch 1004b. The third PD signal, which is a combined signal of the signal of the PD 204d and the second noise signal, is thereby stored in the capacitor 1005b.

After the elapse of period t812, the control circuit 106 sets the drive pulses φHN2 and φHa2 to high, and outputs the signal of the PD 204d (signal obtained by subtracting the second noise signal from the third PD signal) from the readout amplifier 1011b.

In this way, the first noise signal and the second noise signal read out by the readout circuitry 103 are stored in the capacitor 1003b, the first and third PD signals are stored in the capacitor 1005b, and the second PD signal is stored in the capacitor 1007b. The signal (A image signal) obtained by subtracting the first noise signal from the first PD signal and the signal (B image signal) obtained by subtracting the second noise signal from the third PD signal are then output via the readout amplifier 1011b. Since the imaging signal is a combined signal of the signals of the PD 203b and the PD 204b, the imaging signal can be obtained by combining the A image signal and the B image signal.

Drive control according to the variation involves sequentially reading out the signals of the two PDs within one pixel, at the time of signal readout of the focus detection pixel. Thus, the number of times that the reset signal is read out increases compared to drive control that involves reading out the signal of one PD and then combining the signal of the second PD with the signal of the first PD, as described using FIG. 7, and the readout time becomes longer.

However, since schematic sequence of signal readout operations will also be as shown in FIG. 5B in the variation, shortening of the overall signal readout time can be realized, when compared to former drive control (FIG. 5A). This shortening is due to the shortening of the signal readout time of the imaging pixels.

As in the first and second embodiments, an increase in the speed of signal readout can be realized, by using a plurality of arrangement patterns in which the arrangement of focus detection pixels and imaging pixels differs, and performing drive control that depends on the arrangement pattern. Also, since the time difference from reading out of the signal at the time of resetting until reading out of the imaging signal is the same for pixels provided with color filters of the same color, this configuration tends not to lead to noticeable variation in noise levels, and is also advantageous in terms of image quality.

According to the present invention, an increase in the speed of reading out of focus detection pixels and imaging pixels is thus made possible, without increasing streak noise in the imaging signals.

Also, in the first and second embodiments, since the output order of pixel data that is output from the image sensor 100 is the same as the order in which the pixels are arranged, it is not necessary for the pixel data to be rearranged inside or outside the image sensor 100 when used as image signals.

Application to Digital Camera

Figure 9:
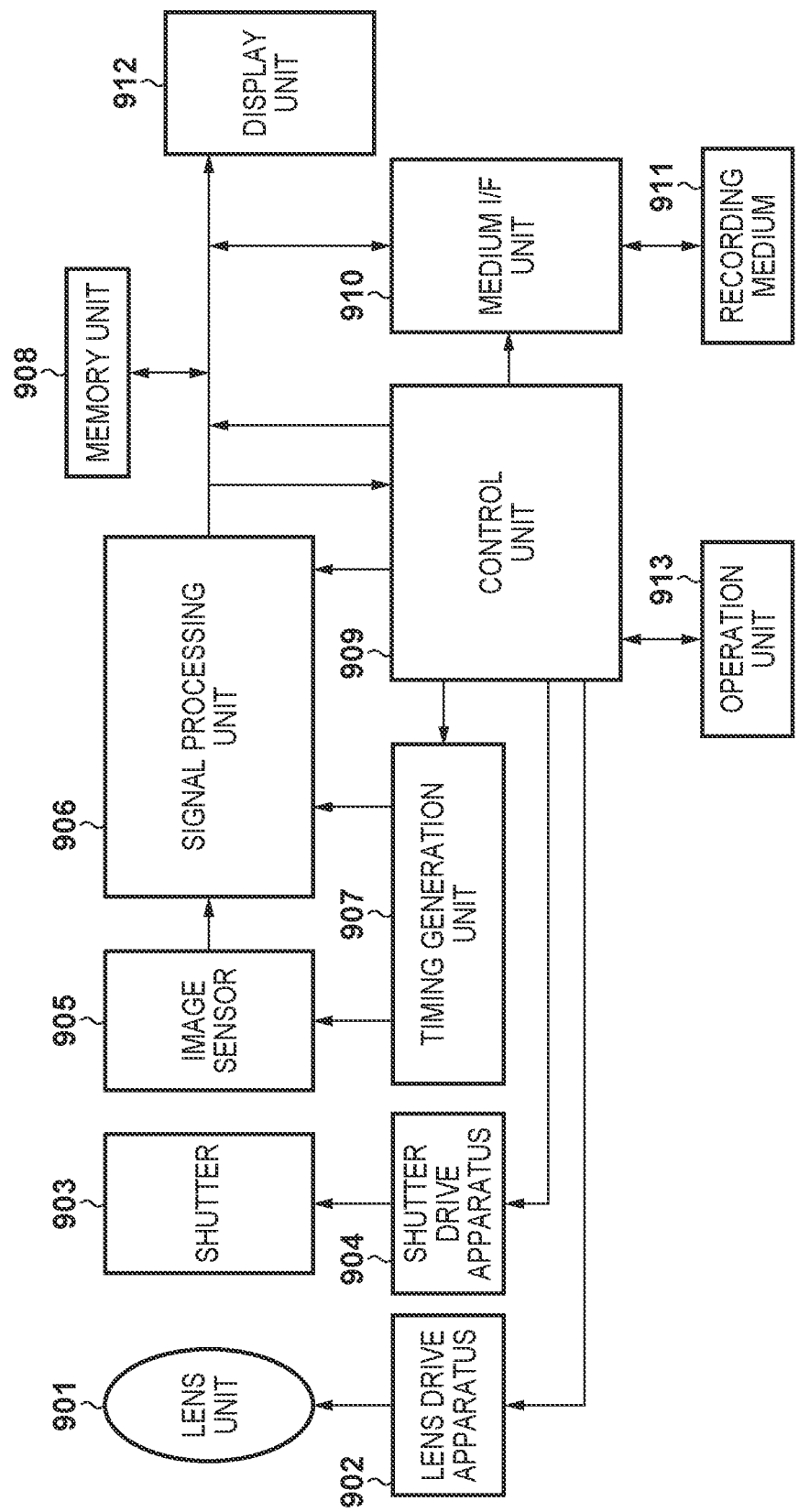
FIG. 9 is a block diagram showing an exemplary functional configuration of an image capture apparatus according to an embodiment.

An embodiment in which the abovementioned image sensor is applied to the digital camera will be described using FIG. 9. A lens unit 901 is an imaging optical system that forms an optical image of a subject on an image sensor 905, and has a focusing lens, a magnification lens, a diaphragm, and the like. The drive of the focusing lens position, the magnification lens position, the opening diameter of the diaphragm and the like in the lens unit 901 are controlled by a control unit or a controller 909 through a lens drive apparatus 902.

A mechanical shutter 903 is disposed between the lens unit 901 and the image sensor 905, and the drive is controlled by the control unit 909 through a shutter drive apparatus 904. The image sensor 905 converts the optical image formed with the lens unit 901 using a plurality of pixels into image signals. A signal processing unit 906 performs various processing such as A/D conversion, demosaic processing, white balance adjustment and encoding on the image signals output from the image sensor 905. The signal processing unit 906 also implements focus detection processing for detecting the defocusing amount and direction with a phase difference detection method, based on the A image signals and the B image signals that are obtained from the image signals that are output by the image sensor 905.

A timing generation unit 907 outputs various timing signals to the image sensor 905 and the signal processing unit 906. The control unit 909 has memories (ROM, RAM) and a microprocessor (CPU), for example, and realizes various functions of the digital camera by a program stored in the ROM being loaded into the RAM and the CPU executing the loaded program and controlling the respective units. Automatic focusing detection (AF) and automatic exposure control (AE) are included in the functions that are realized by the control unit 909.

A memory unit 908 is used by the control unit 909 and the signal processing unit 906 to temporarily store image data and as a work area. A medium I/F unit 910 is an interface for reading and writing a recording medium 911, which is a removable memory card, for example. A display unit 912 is typically an LCD, and is used in order to display shot images and various information of the digital camera. An operation unit 913 is a user interface for a user to instruct and set the digital camera, such as a power switch, a release button and a menu button.

Operations of the digital camera when shooting is performed will be described.

When power supply is turned on, the digital camera enters a shooting standby state. The control unit 909 starts moving image shooting processing and display processing for causing the display unit 912 to operate as an electronic viewfinder. When a shooting preparation instruction (e.g., half press of the release button of the operation unit 913) is input in the shooting standby state, the control unit 909 starts focus detection processing. Specifically, the control unit 909 performs drive control such as described in the first or second embodiment, for example, on pixel rows that are included in the focus detection area. The control unit 909 then derives the amount of image shift based on the phase difference of signal waveforms obtained by connecting A image signals and B image signals of the same type that are obtained from a plurality of pixels, and obtains the defocusing amount and direction.

The control unit 909 then derives the movement amount and movement direction of the focusing lens of the lens unit 901 from the obtained defocusing amount and direction, drives the focusing lens through the lens drive apparatus 902, and adjusts the focus of the imaging optical system. After the drive, the control unit 909 may further perform focus detection that is based on a contrast evaluation value to finely adjust the focusing lens position if necessary.

Thereafter, when a shooting start instruction (e.g., full press of the release button) is input, the control unit 909 executes a shooting operation for recording, processes the obtained image data with the signal processing unit 906, and stores the processed image data in the memory unit 908. The control unit 909 records the image data stored in the memory unit 908 to the recording medium 911 through the medium control I/F unit 910. Note that the image data may be output from an external I/F unit that is not illustrated to an external apparatus such as a computer.

Other Embodiments

In the abovementioned embodiment, a configuration in which pixel rows having different arrangements of pixels that perform readout as focus detection pixels and pixels that perform readout as imaging pixels are alternately disposed adjacent to each other was illustrated. This is a configuration in which the influence of noise that is caused by differences in time from reading out of a noise signal until reading out of an imaging signal is least noticeable. However, a configuration in which the pixel rows having different arrangements of pixels that perform readout as focus detection pixels and pixels that perform readout as imaging pixels are alternately disposed in units of a predetermined plurality of rows may be adopted. Also, at least pixel rows outside the focus detection area may be pixel rows consisting only of imaging pixels.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155390, filed on Aug. 5, 2015, which is hereby incorporated by reference herein in its entirety.

What is claimed is:
1. An image sensor comprising:
a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and
a controller that controls signal readout from the pixel array, wherein the focus detection pixels and the imaging pixels are arranged in a first pattern in a first type of pixel row in the pixel array, and the focus detection pixels and the imaging pixels are arranged in a second pattern in a second type of pixel row in the pixel array, the controller performs readout control that differs between the first type of pixel row and the second type of pixel row, and the controller performs the readout control such that a signal readout operation in one of the first type of pixel row and the second type of pixel row is performed without waiting for a signal readout operation in the other type of the pixel row.

2. The image sensor according to claim 1, wherein, in the pixel array, the first type of pixel row(s) and the second type of pixel row(s) are alternately arranged in a predetermined cycle.

3. The image sensor according to claim 1, wherein each of the focus detection pixels has a plurality of photoelectric conversion portions, and each of the imaging pixels has one photoelectric conversion portion.

4. The image sensor according to claim 1, wherein each of the focus detection pixels and the imaging pixels has a plurality of photoelectric conversion portions, and each of the imaging pixels outputs a signal obtained by combining outputs of the plurality of photoelectric conversion portions as the image signal.

5. The image sensor according to claim 4, wherein in the readout control, the controller controls readout from the focus detection pixel so as to read out the image signal after reading out one focus detection signal, and does not reset a charge accumulation portion configured to be used in signal readout of the focus detection pixel, between reading out of the one focus detection signal and reading out of the image signal.

6. The image sensor according to claim 4, wherein in the readout control, the controller controls readout from the focus detection pixel so as to read out a plurality of focus detection signals from the focus detection pixel, and resets a charge accumulation portion that is used in signal readout of the focus detection pixel, between reading out of different focus detection signals.

7. The image sensor according to claim 1, wherein the pixel array has, per every pixel, a charge accumulation portion that accumulates charge generated by a photoelectric conversion portion; a reset portion that resets the charge accumulation portion and the photoelectric conversion portion; and a switch that connects the charge accumulation portion and a readout line.

8. The image sensor according to claim 1, wherein the pixel array has, per every two adjacent pixels, a charge accumulation portion that accumulates charge generated by a photoelectric conversion portion; a reset portion that resets the charge accumulation portion and the photoelectric conversion portion; and a switch that connects the charge accumulation portion and a readout line.

9. An image capture apparatus comprising:
an image sensor;
a focus detection unit that performs focus detection with a phase difference detection method using focus detection signals read out from focus detection pixels of the image sensor; and an adjustment unit that adjusts a focus of an imaging optical system, based on a result of the focus detection,
wherein the image sensor includes:
a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and
a controller that controls signal readout from the pixel array,
wherein the focus detection pixels and the imaging pixels are arranged in a first pattern in a first type of pixel row in the pixel array, and the focus detection pixels and the imaging pixels are arranged in a second pattern in a second type of pixel row in the pixel array,
the controller performs readout control that differs between the first type of pixel row and the second type of pixel row, and
the controller performs readout control such that a signal readout operation in one of the first type of pixel row and the second type of pixel row is performed without waiting for a signal readout operation in the other type of the pixel row.

10. A control method for an image sensor having a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal, the focus detection pixels and the imaging pixels being arranged in a first pattern in a first type of pixel row in the pixel array, and the focus detection pixels and the imaging pixels being arranged in a second pattern in a second type of pixel row in the pixel array, the method comprising:
performing readout control that differs between the first type of pixel row and the second type of pixel row,
wherein in the performing, a signal readout operation in one of the first type of pixel row and the second type of pixel row is controlled without waiting for a signal readout operation in the other type of the pixel row.

11. An image sensor comprising:
a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and
a controller that controls signal readout from the pixel array,
wherein the focus detection pixels and the imaging pixels are arranged in a first pattern in a first type of pixel row in the pixel array, and the focus detection pixels and the imaging pixels are arranged in a second pattern in a second type of pixel row in the pixel array,
the controller performs readout control that differs between the first type of pixel row and the second type of pixel row, and
each of the focus detection pixels and the imaging pixels has a plurality of photoelectric conversion portions, and each of the imaging pixels outputs a signal obtained by combining outputs of the plurality of photoelectric conversion portions as the image signal.

12. The image sensor according to claim 11,
wherein in the readout control, the controller controls readout from the focus detection pixel so as to read out the image signal after reading out one focus detection signal, and does not reset a charge accumulation portion configured to be used in signal readout of the focus detection pixel, between reading out of the one focus detection signal and reading out of the image signal.

13. The image sensor according to claim 11,
wherein in the readout control, the controller controls readout from the focus detection pixel so as to read out a plurality of focus detection signals from the focus detection pixel, and resets a charge accumulation portion that is used in signal readout of the focus detection pixel, between reading out of different focus detection signals.

14. The image sensor according to claim 11,
wherein the pixel array has, per every pixel, a charge accumulation portion that accumulates charge generated by a photoelectric conversion portion; a reset portion that resets the charge accumulation portion and the photoelectric conversion portion; and a switch that connects the charge accumulation portion and a readout line.

15. An image capture apparatus comprising:
an image sensor;
a focus detection unit that performs focus detection with a phase difference detection method using focus detection signals read out from focus detection pixels of the image sensor; and
an adjustment unit that adjusts a focus of an imaging optical system, based on a result of the focus detection,
wherein the image sensor includes:
   a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal; and
   a controller that controls signal readout from the pixel array,
wherein the focus detection pixels and the imaging pixels are arranged in a first pattern in a first type of pixel row in the pixel array, and the focus detection pixels and the imaging pixels are arranged in a second pattern in a second type of pixel row in the pixel array,
the controller performs readout control that differs between the first type of pixel row and the second type of pixel row, and
each of the focus detection pixels and the imaging pixels has a plurality of photoelectric conversion portions, and each of the imaging pixels outputs a signal obtained by combining outputs of the plurality of photoelectric conversion portions as the image signal.

16. A control method for an image sensor having a pixel array in which focus detection pixels and imaging pixels are arranged in a matrix, wherein each of the focus detection pixels outputs a signal for focus detection with a phase difference detection method and an image signal and wherein each of the imaging pixels outputs an image signal and does not output a focus detection signal, the focus detection pixels and the imaging pixels being arranged in a first pattern in a first type of pixel row in the pixel array, and the focus detection pixels and the imaging pixels being arranged in a second pattern in a second type of pixel row in the pixel array, the method comprising:
performing readout control that differs between the first type of pixel row and the second type of pixel row, and
wherein each of the focus detection pixels and the imaging pixels has a plurality of photoelectric conversion portions, and each of the imaging pixels outputs a signal obtained by combining outputs of the plurality of photoelectric conversion portions as the image signal.

* * * * *